(12) United States Patent
Jeon et al.

(10) Patent No.: US 7,850,573 B2
(45) Date of Patent: Dec. 14, 2010

(54) SHIFT CONTROL METHOD OF AUTOMATIC TRANSMISSION

(75) Inventors: Byeong Wook Jeon, Seoul (KR); Hyungsoo Lee, Ansan (KR)

(73) Assignee: Hyundai Motor Company, Seoul (KR)

( * ) Notice: Subject to any disclaimer, the term of this patent is extended or adjusted under 35 U.S.C. 154(b) by 537 days.

(21) Appl. No.: 11/966,268

(22) Filed: Dec. 28, 2007

(65) Prior Publication Data

US 2009/0131221 A1 May 21, 2009

(30) Foreign Application Priority Data

Nov. 15, 2007 (KR) ...................... 10-2007-0116626

(51) Int. Cl.
*F16H 61/26* (2006.01)
(52) U.S. Cl. ........................ 477/130; 477/136; 477/141; 477/156
(58) Field of Classification Search .................. 477/127, 477/130, 131, 138, 156, 159, 135, 136, 140, 477/141

See application file for complete search history.

(56) References Cited

U.S. PATENT DOCUMENTS

| | | | | |
|---|---|---|---|---|
| 6,270,444 | B1 * | 8/2001 | Tsutsui et al. | 477/143 |
| 6,626,786 | B2 * | 9/2003 | Hayabuchi et al. | 475/127 |
| 6,832,976 | B2 * | 12/2004 | Nishida et al. | 477/120 |
| 6,955,629 | B2 * | 10/2005 | Nishida et al. | 477/143 |
| 6,997,843 | B2 * | 2/2006 | Saitou | 475/269 |

* cited by examiner

*Primary Examiner*—Ha D. Ho
(74) *Attorney, Agent, or Firm*—Morgan, Lewis & Bockius LLP (57) ABSTRACT

A shift control method of an automatic transmission according to an exemplary embodiment of the present invention may control a shift from an N speed achieved by engagement of first and second frictional elements to an N-3 speed achieved by engagement of third and fourth frictional elements, wherein release of the second frictional element is completed after release of the first frictional element begins, and engagement of the fourth frictional element begins after engagement of the third frictional element begins, wherein the engagement of the third frictional element is completed after the release of the second frictional element is completed.

15 Claims, 6 Drawing Sheets

SHIFT CONTROL METHOD OF AUTOMATIC TRANSMISSION

CROSS-REFERENCE TO RELATED APPLICATION

This application claims priority to and the benefit of Korean Patent Application No. 10-2007-0116626, filed in the Korean Intellectual Property Office on Nov. 15, 2007, the entire contents of which are incorporated herein by reference.

BACKGROUND OF THE INVENTION (a) Field of the Invention

The present invention relates to a skip-shift control method of an automatic transmission. More particularly, the present invention relates to a shift control method of an automatic transmission that controls a skip-shift from an N speed achieved by engagement of first and second frictional elements to an N-3 speed achieved by engagement of third and fourth frictional elements.

(b) Description of the Related Art

Generally, one frictional element is released and another frictional element is engaged according to a clutch-to-clutch shift control. However, during a specific skip-shifting process, two frictional elements may be released and two other frictional elements may be engaged.

Particularly, in the case of a kick-down 6 to 3 skip shift where three speed steps are shifted, generally two frictional elements must be released and two other frictional elements must be engaged. However, it is understood that shift control of releasing two frictional elements and engaging two other frictional elements is hard to be realized.

Therefore, much research on two shifting processes that are successively performed in the case of a skip-shift, such as a 6 to 3 shift, have been conducted. For example, a 4 to 3 shift is performed after a 6 to 4 shift is completed so as to perform a 6 to 3 shift.

However, according to such a conventional 6 to 3 skip-shift control method, since two shifting processes are successively performed, shifting time may be taken long. That is, since the 4 to 3 shift is performed after the 6 to 4 shift is completed, the shifting time may be long.

In addition, since the 4 to 3 shift is performed after the 6 to 4 shift is completed, the shifting process may not be smoothly performed and a driver's shift feel deteriorates.

To solve such problems, many shift control methods of an automatic transmission where a first shift from a 6 speed to a 4 speed and a second shift from the 4 speed to a 3 speed are overlapped have been researched. In such a shift control method, a second shift from a middle speed between the 6 speed and the 3 speed to the 3 speed is overlapped with a first shift from the 6 speed to the middle speed when a 6 to 3 shift signal is detected.

However, according to such a shift control method, a shift torque of the middle speed may be generated and a double shift feel may be felt since shifting from the 6 speed to the 3 speed is performed by way of the middle speed. Further, shift shock may occur.

Figure 6:
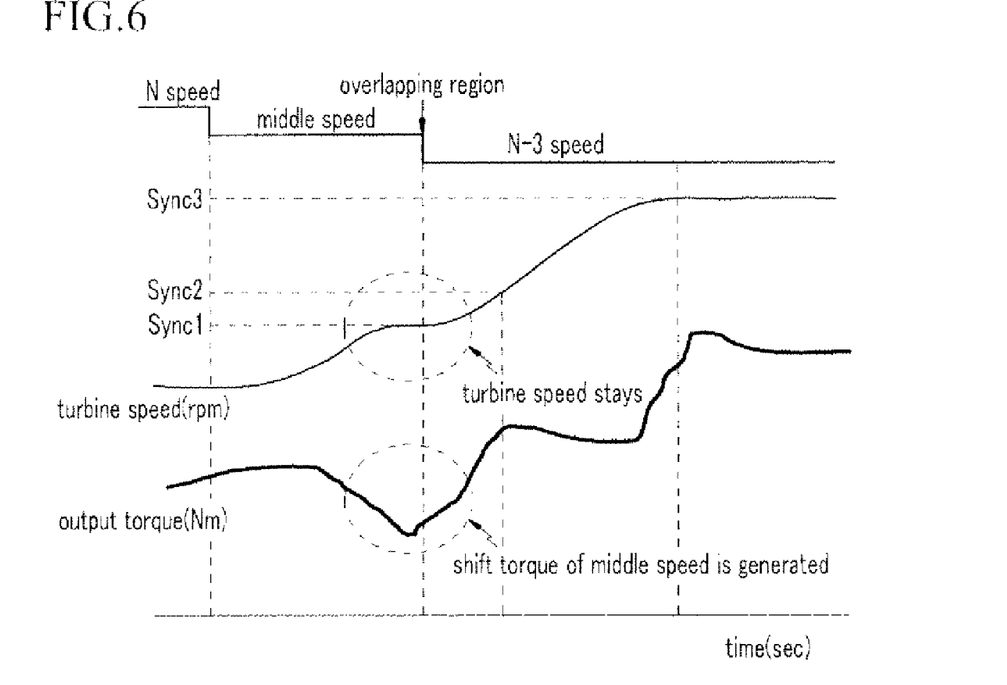
FIG. 6 is a graph showing a turbine speed and an output torque when a shift is performed according to a conventional shift control method.

More concretely, in a case in which a shift is performed according to the conventional shift control method, a turbine speed remains at the middle speed for a time, and output torque fluctuates seriously, as shown in FIG. 6.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a shift control method of an automatic transmission having advantages of improving shift feel as a consequence of a middle speed between an N speed and an N-3 speed not being realized when a shift from the N speed to the N-3 speed is performed.

In addition, the present invention has been made in an effort to provide a shift control method of an automatic transmission having further advantages of controlling tour frictional elements simultaneously without additional speed detecting means.

A shift control method of an automatic transmission according to an exemplary embodiment of the present invention may control a shift from an N speed achieved by engagement of first and second frictional elements to an N-3 speed achieved by engagement of third and fourth frictional elements, wherein release of the second frictional element is completed after release of the first frictional element begins, and engagement of the fourth frictional element begins after engagement of the third frictional element begins, wherein the engagement of the third frictional element is completed after the release of the second frictional element is completed.

The engagement of the third frictional element and the release of the first frictional element may be initiated substantially at the same time.

The release of the second frictional element and the engagement of the fourth friction element may be initiated at a first shift synchronizing point.

The first shift synchronizing point may be reached when a current gear ratio is the same as a first predetermined gear ratio.

The release of the second frictional element may be completed and hydraulic pressure for engagement of the third frictional element is increased with predetermined pressure slope at a second shift synchronizing point.

The second shift synchronizing point may be reached when a current gear ratio is the same as a second predetermined gear ratio.

The engagement of the third frictional element may be completed and hydraulic pressure for engagement of the third frictional element begins to be increased with a predetermined pressure slope at a third shift synchronizing point.

The third shift synchronizing point may be reached when a current gear ratio is the same as a third predetermined gear ratio.

Hydraulic pressure of the first frictional element may be controlled such that a slope of a turbine speed is controlled.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
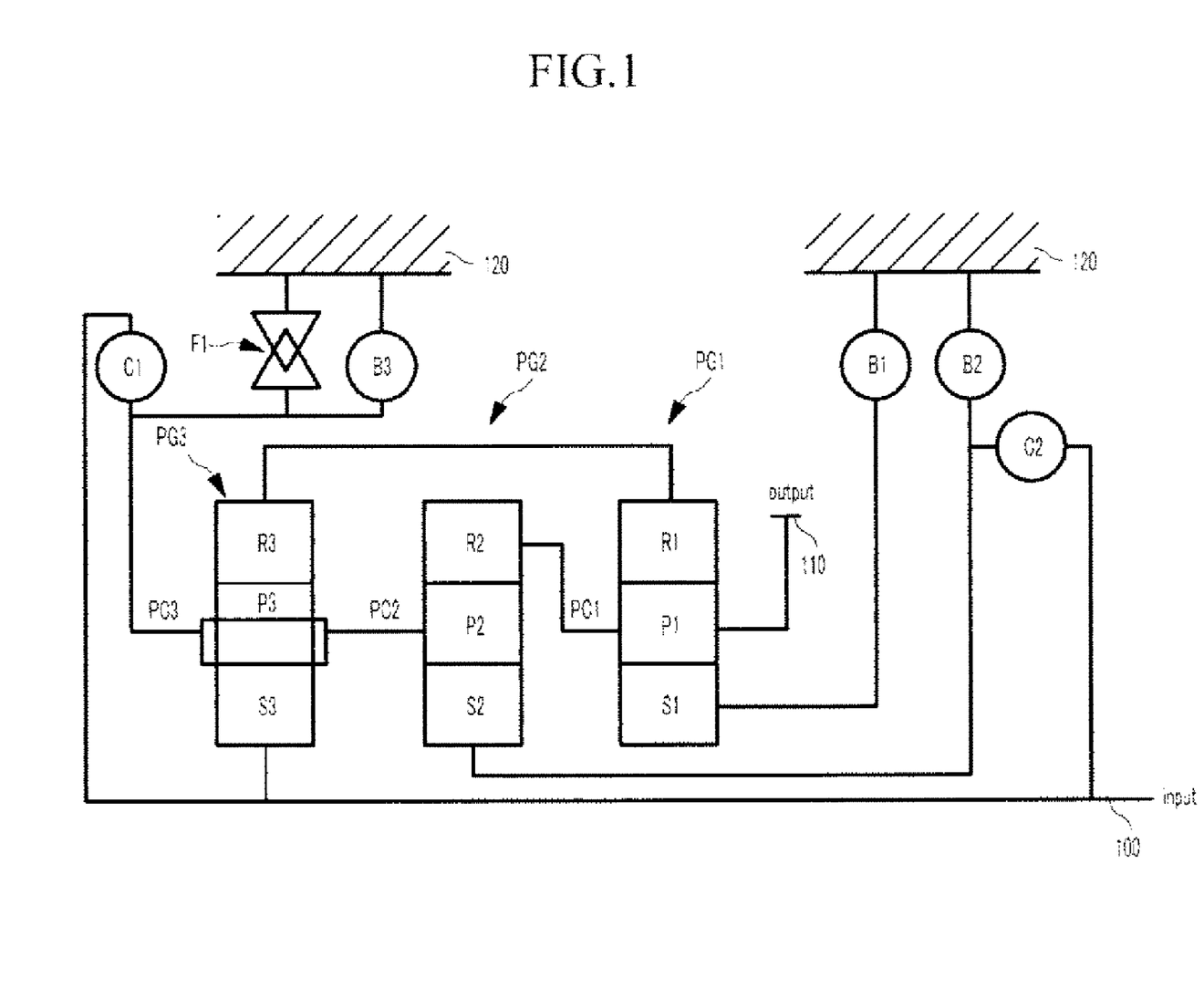
FIG. 1 is a schematic diagram showing a power train of an automatic transmission that is applicable to a shift control method of a 6-speed automatic transmission according to an exemplary embodiment of the present invention.

FIG. 1 is a schematic diagram showing a power train of an automatic transmission that is applicable to a shift control method of an automatic transmission according to an exemplary embodiment of the present invention.

As shown in FIG. 1, a power train of an automatic transmission that is applicable to a shift control method of an automatic transmission according to an exemplary embodiment of the present invention includes first, second, and third planetary gear sets PG1, PG2, and PG3.

The first planetary gear set PG1 is a single pinion planetary gear set, and includes a first sun gear S1, a first planet carrier PC1, and a first ring gear R1 as operational members thereof.

A first pinion gear P1, being engaged with the first ring gear R1 and the first sun gear S1, is connected to the first planet carrier PC1.

The second planetary gear set PG2 is a single pinion planetary gear set, and includes a second sun gear S2, a second planet carrier PC2, and a second ring gear R2 as operational members thereof. A second pinion gear P2, being engaged with the second ring gear R2 and the second sun gear S2, is connected to the second planet carrier PC2.

The third planetary gear set PG3 is a double pinion planetary gear set, and includes a third sun gear S3, a third planet carrier PC3, and a third ring gear R3 as operational members thereof. A third pinion gear P3, being engaged with the third ring gear R3 and the third sun gear S3, is connected to the third planet carrier PC3.

In addition, the power train of an automatic transmission includes an input shaft 100 for receiving torque from an engine (not shown), an output gear 110 for outputting torque from the power train, and a transmission case 120.

According to the power train of an automatic transmission, the first planet carrier PC1 is fixedly connected to the second ring gear R2.

The second planet carrier PC2 is fixedly connected to the third planet carrier PC3.

The first ring gear R1 is fixedly connected to the third ring gear 3.

The third sun gear S3 always acts as an input element by being fixedly connected to the input shaft 100.

The first planet carrier PC1 always acts as an output element by being fixedly connected to the output gear 110.

The third planet carrier PC3 is variably connected to the input shall 100 via a first clutch C1.

The second suit gear S2 is variably connected to the input shaft 100 via a second clutch C2

The first sun gear S1 is variably connected to the transmission case 120 via a first brake B1 and is subjected to a stopping operation of the first brake B1.

The second sun gear S2 is variably connected to the transmission case 120 via a second brake B2 and is subjected to a stopping operation of the second brake B2.

The third planet carrier PC3 is variably connected to the transmission case 120 via a third brake 133 and is subjected to a stopping operation of the third brake B3.

In addition, a one-way clutch F1, being disposed between the third planet carrier PC3 and the transmission case 120, is disposed in parallel with the third brake B3.

Figure 2:
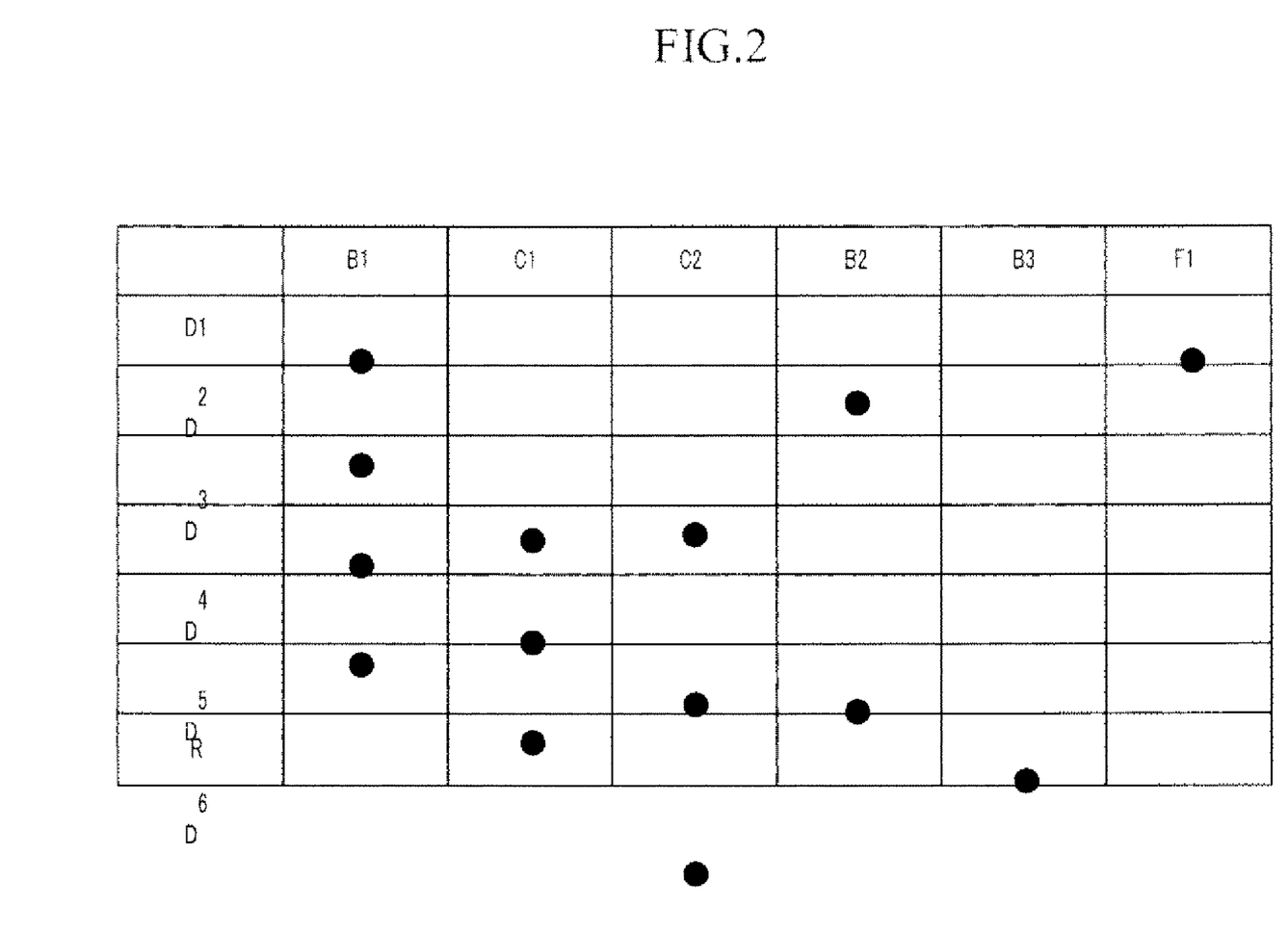
FIG. 2 is an operational chart of a power train of an automatic transmission that is applicable to a shift control method of an automatic transmission according to an exemplary embodiment of the present invention.

FIG. 2 is an operational chart of a power train of an automatic transmission that is applicable to a shift control method of an automatic transmission according to an exemplary embodiment of the present invention.

As shown in FIG. 2, the first brake B1 and the one-way clutch F1 are operated at a first forward speed D1, the first and second brakes B1 and B12 are operated at a second forward speed, and the first brake B1 and the second clutch C2 are operated at a third forward speed D3. The first brake B1 and the first clutch C1 are operated at a fourth forward speed D4, the first and second clutches C1 and C2 are operated at a fifth forward speed D5, and the first clutch C1 and the second brake B2 are operated at a sixth forward speed D6.

In addition, the second clutch C2 and the third brake B3 are operated at a reverse speed R.

Hereinafter, up-shifting processes for the power train of an automatic transmission shown in FIG. 1 will be described in detail.

In a shifting process from the first forward speed D1 to the second forward speed D2, the second brake 132 is operated. In this case, the one-way clutch F1 is automatically released without an additional control.

In a shifting process from the second forward speed D2 to the third forward speed D3, the second brake B2 is released, and the second clutch C2 is operated.

In a shifting process from the third forward speed D3 to the fourth forward speed D4, the second clutch C2 is released, and the first clutch C1 is operated.

In a shilling process from the fourth forward speed D4 to the fifth forward speed D5, the first brake 131 is released, and the second clutch C2 is operated.

In a shifting process from the fifth forward speed D5 to the sixth forward speed D6, the second clutch C2 is released, and the second brake B2 is operated.

Down-shifting processes are opposite processes to those of the up-shifting processes.

Hereinafter, skip-down shifting processes for the power train of the automatic transmission shown in FIG. 1 will be described in detail.

In a skip-shifting process from the sixth forward speed D6 to the fourth forward speed D4, the second brake B2 is released and the first brake B1 is operated.

In a skip-shifting process from the fifth forward speed D5 to the third forward speed D3, the first clutch C1 is released and the first brake B2 is operated.

In a skip-shifting process from the fourth forward speed D4 to the second forward speed D2, the first clutch C1 is released and the second brake 132 is operated.

In a skip-shifting process from the third forward speed D3 to the first forward speed D1, the second clutch C2 is released. The one-way clutch F1 is automatically operated.

Figure 3:
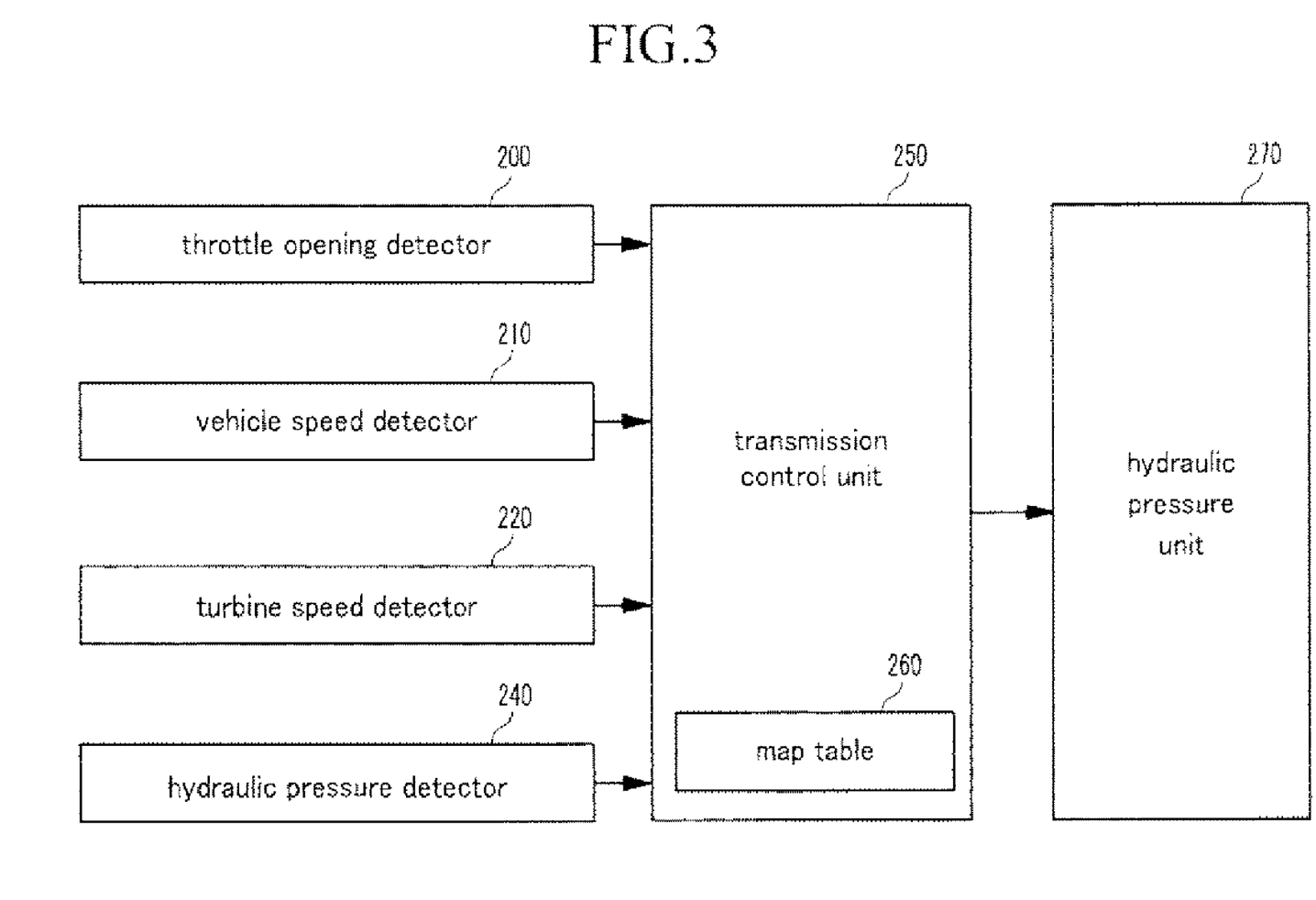
FIG. 3 is a block diagram of a system that performs a shift control method of an automatic transmission according to an exemplary embodiment of the present invention.

FIG. 3 is a block diagram of a system that performs a shift control method of an automatic transmission according to an exemplary embodiment of the present invention.

As shown in FIG. 3, a system that performs a shift control method of an automatic transmission according to an exemplary embodiment of the present invention includes a throttle opening detector 200, a vehicle speed detector 210, a turbine speed detector 220, a hydraulic pressure detector 240, a transmission control unit 250, and a hydraulic pressure control unit 270.

The throttle opening detector 200 detects a throttle opening that is operated in accordance with an operation of an acceleration pedal, and transmits a signal corresponding thereto to the transmission control unit 250.

The vehicle speed detector 210 detects a vehicle speed and transmits its a signal corresponding thereto to the transmission control unit 250.

The turbine speed detector 220 detects a current turbine speed operated as an input torque of the automatic transmission from an angular change of a crank shaft, and transmits a signal corresponding thereto to the transmission control unit 250.

The hydraulic pressure detector 240 detects hydraulic pressures applied to respective off-going and on-coming elements and transmits a signal corresponding thereto to the transmission control unit 250.

The transmission control unit 250 can be realized by one or more processors activated by a predetermined program, and the predetermined program can be programmed to perform each step of a shill control method of an automatic transmission according to an embodiment of this invention.

The transmission control unit 250 receives the throttle opening, vehicle speed, turbine speed, and hydraulic pressure signals from the throttle opening detector 200, the vehicle speed detector 210, the turbine speed detector 220, and the hydraulic pressure detector 240, respectively.

In addition, the transmission control unit 250 calculates a current gear ratio based on the vehicle speed and the turbine speed detected by the vehicle speed detector 210 and the turbine speed detector 220 respectively.

The transmission control unit 250 generates a hydraulic pressure shift signal corresponding to the input signals detected by the throttle opening detector 200, the vehicle speed detector 210, the turbine speed detector 220, and the hydraulic pressure detector 240 and outputs the hydraulic pressure shift signal to the hydraulic pressure control unit 270.

In addition, the transmission control unit 250 includes a map table 260.

Data of the throttle opening detected by the throttle opening detector 200 in accordance with the vehicle speed at each shift speed is stored in the map table 260. Therefore, the transmission control unit 250 calculates a target shift speed in accordance with the throttle opening signal and the vehicle speed signal, and determines whether a shifting condition is satisfied.

In addition, an off-going hydraulic pressure of an off-going element and an on-coming hydraulic pressure of an on-coming element at each shift speed are stored in the map table 260.

Further, a gear ratio at each speed is also stored in the map table 260.

Such data of throttle opening, on-coming and off-going pressures, and gear ratio stored in the map table 260 may be preset by a person of ordinary skill in the art according to vehicle and engine types that are applicable to a shift control method of an automatic transmission according to an embodiment of the present invention.

The hydraulic pressure control unit 270 receives the hydraulic pressure shift signal from the transmission control unit 250 and controls hydraulic pressures applied to respective off-going and on-coming elements. The hydraulic pressure control unit 240 includes at least one of control valves and solenoid valves that control the hydraulic pressure applied to respective off-going and on-coming elements.

Hereinafter, referring to FIG. 4, a shift control method according to an exemplary embodiment of the present invention will be described in detail.

Figure 4:
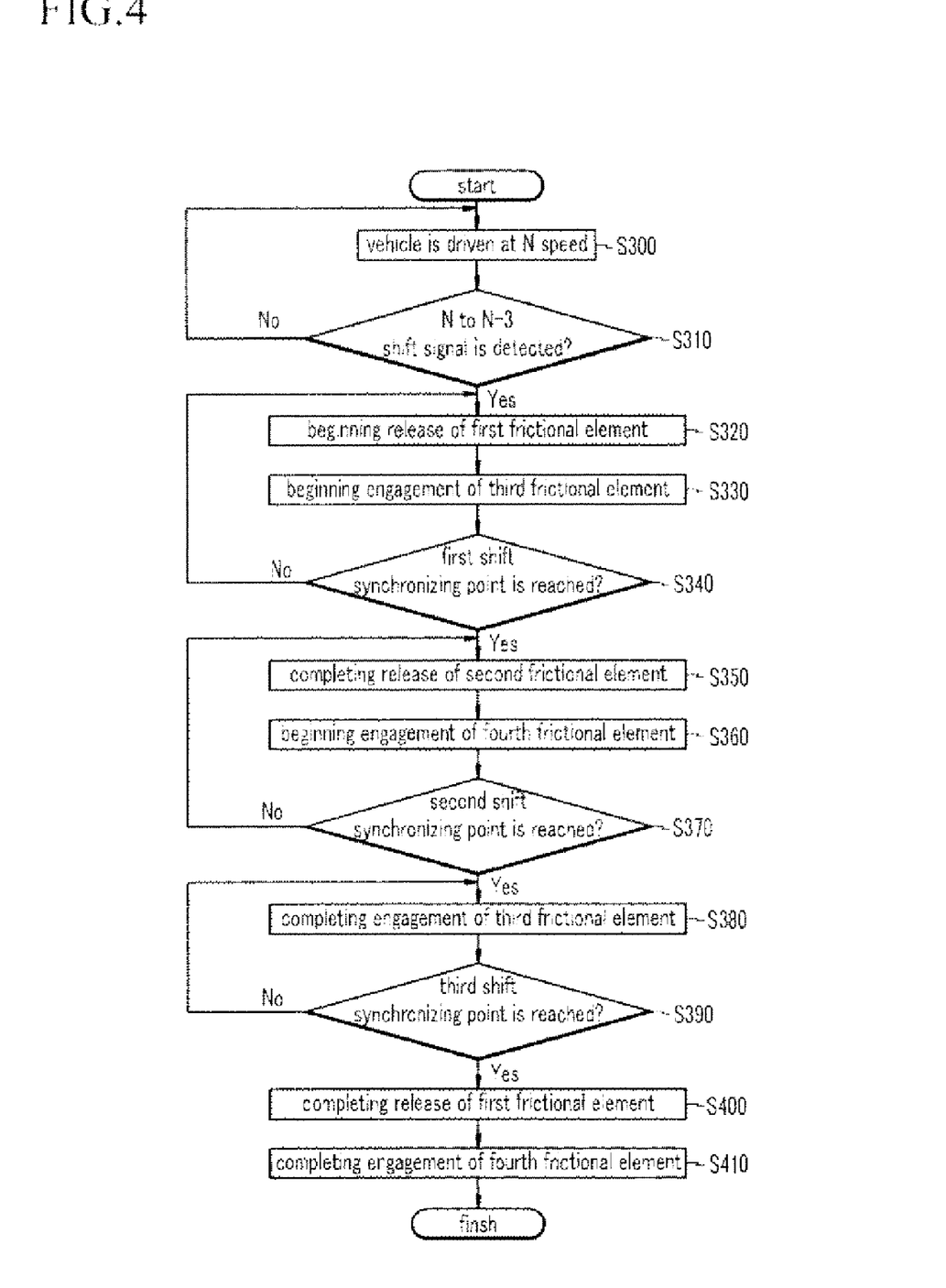
FIG. 4 is a flowchart showing a shift control method of an automatic transmission according to an exemplary embodiment of the present invention.

FIG. 4 is a flowchart showing a shift control method of an automatic transmission according to an exemplary embodiment of the present invention.

In a shift control method of an automatic transmission according to an exemplary embodiment of the present invention, an N shift speed may be achieved by engagement of first and second frictional elements, and an N-3 shift speed be achieved by engagement of third and fourth frictional elements.

As shown in FIG. 4, in a state in which a vehicle is driven at the N shift speed at step S300, the transmission control unit 250 determines whether all N to N-3 shift signal is detected at step S310. The N to N-3 shift signal is generated when the throttle opening in accordance with the vehicle speed is larger than or equal to a predetermined throttle opening.

If the transmission control unit 250 does not detect the N to N-3 shift signal at the step S310, the vehicle continues to be driven at the N shift speed at the step S300. If the transmission control unit 250 detects the N to N-3 shift signal at the step S310, the transmission control unit 250 begins release of the first frictional element at step S320 and engagement of the third functional element at step S330. The release of the first frictional element and the engagement of the third frictional element may begin substantially at the same time.

Here, the beginning of the release of frictional element and the engagement of the frictional element signifies that hydraulic pressure of each frictional element is started to be controlled. That is, the beginning of the release of the functional element signifies that the hydraulic pressure applied to the frictional element is reduced to "0" gradually or quickly, and the beginning of the engagement of the frictional element signifies that the hydraulic pressure of the frictional element is increased to on-coming pressure gradually or quickly.

Figure 5:
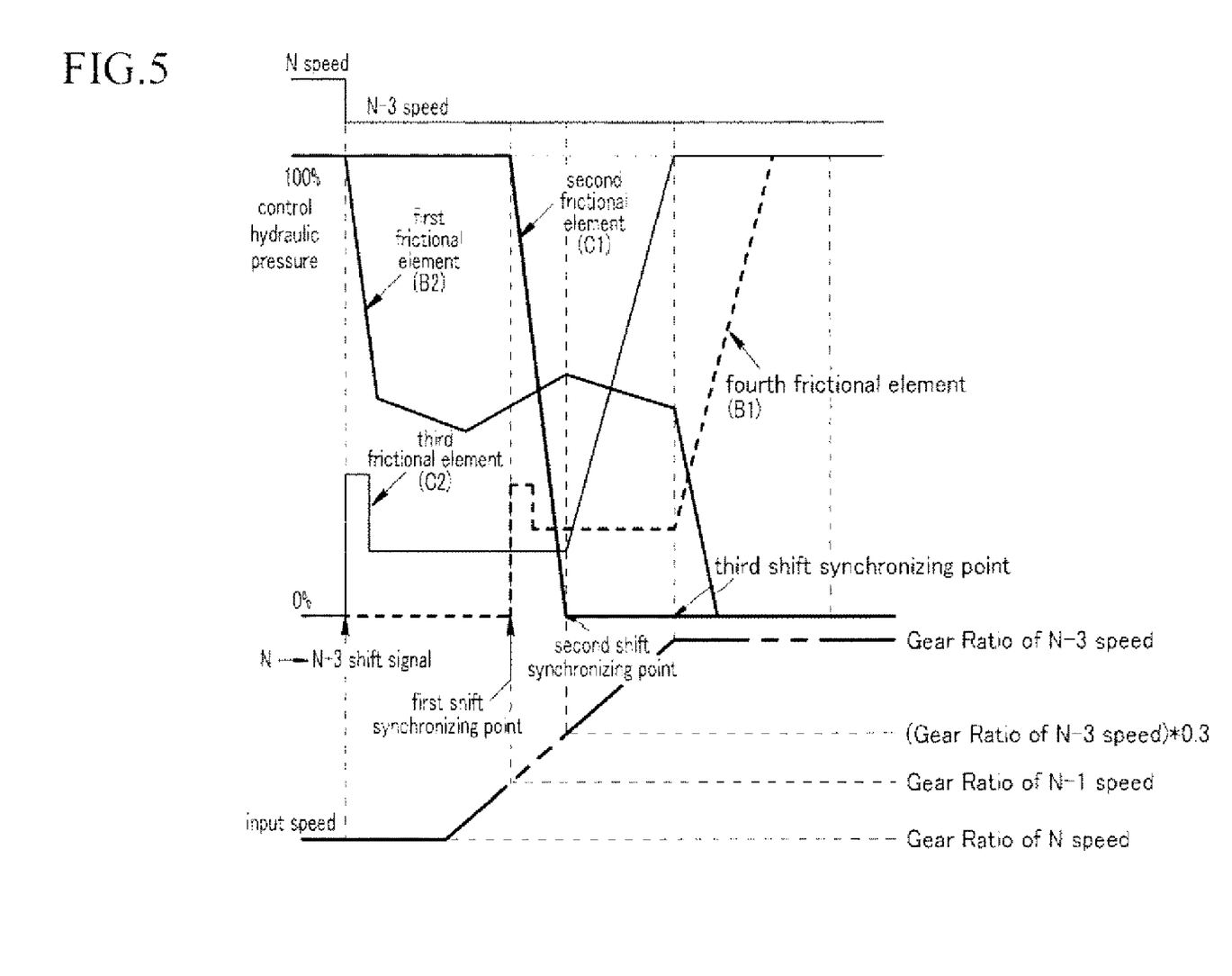
FIG. 5 is a graph showing control hydraulic pressure, an input speed, and an output speed of an exemplary shift control method of an automatic transmission according to an embodiment of the present invention.

While performing the release of the first frictional element and the engagement of the third frictional element, the transmission control unit 250 determines whether a first shift synchronizing point is reached at step S340. As shown in FIG. 5 as an exemplary embodiment of the present invention, the first shift synchronizing point may be reached when the current gear ratio is the same as a first predetermined gear ratio, and the first predetermined gear ratio may be a gear ratio of a middle speed (here, an N-1 speed). The middle speed is a speed where torque transmission in a shifting process can be minimized.

If the first shift synchronizing point is not reached at the step S340, the transmission control unit 250 continues to perform the release of the first frictional element and the engagement of the third frictional element. If the first shift synchronizing point is reached at the step S340, the transmission control unit 250 begins the release of the second frictional element at step S350 which hydraulic pressure of the second frictional element starts to be quickly reduced to "0" and begins engagement of the fourth frictional element at step S360.

After that, the transmission control unit 250 determines whether a second shift synchronizing point is reached at step S370. At this time, the complete release of the second frictional element, i.e., hydraulic pressure of the second frictional element is reduced to "0." Further, a hydraulic pressure for engagement of the third friction element is increased with a predetermined hydraulic pressure slope. The complete release of the second frictional element and the start of increasing hydraulic pressure for the third frictional element may occur substantially at the same time.

As shown in FIG. 5, the second shift synchronizing point may be reached when the current gear ratio is the same as a second predetermined gear ratio, and the second predetermined gear ratio may be 30% of a gear ratio at the N-3 speed in an exemplary embodiment of the present invention.

If the second shift synchronizing point is not reached at the step S370, the hydraulic pressure of the second frictional element continues to be reduced.

If the second shift synchronizing point is reached at the step S370, the transmission control unit 250 increases hydraulic pressure for the engagement of the third frictional element at step S380 with a predetermined pressure slope. That is, hydraulic pressure of the third frictional element is increased to the on-coming pressure.

After that, the transmission control unit 250 determines whether a third shift synchronizing point is reached at step S390. As shown in FIG. 5, the third shift synchronizing point may be reached when the current gear ratio is the same as a third predetermined gear ratio, and the third predetermined gear ratio is the same as the gear ratio at the N-3 speed in an exemplary embodiment of the present invention.

If the third shift synchronizing point is not reached at the step S390, the transmission control unit 250 continues to increase the hydraulic pressure of the third frictional element to the on-coming pressure.

If the third shift synchronizing point is reached at the step S390, the transmission control unit 250 completes the release of the first frictional element at step S400 and completes the engagement of the fourth frictional element with a predetermined pressure slope at step S410. That is, hydraulic pressure of the first frictional element is reduced to "0", and hydraulic pressure of the fourth frictional element is increased to the on-coming pressure.

Referring to FIG. 5, a shift control method of an automatic transmission according to an exemplary embodiment of the present invention will be further described in detail.

FIG. 5 is a graph showing control hydraulic pressure, an input speed, and an output speed of an exemplary shift control method of a 6-speed automatic transmission according to an embodiment of the present invention.

For better comprehension and ease of description, a 6 to 3 shift will be described. However, the present invention is not limited to a 6 to 3 shift and is applicable to all N to N-3 shifts, such as a 5 to 2 shift.

In a shift control method of an automatic transmission according to an exemplary embodiment of the present invention, one example of the first, second, third, and fourth frictional elements is described in Table 1.

TABLE 1

| First frictional element | Second frictional element | Third frictional element | Fourth frictional element |
| --- | --- | --- | --- |
| Second brake | First clutch | Second clutch | First brake |

As shown in FIG. 5, in a state where the vehicle is driven at the N speed, the transmission control unit 250 receives the N to N-3 shift signal, begins the release of the first frictional element and the engagement of the third frictional element and begins the engagement of the third frictional element. That is, the hydraulic pressure of the first frictional element is reduced, and the hydraulic pressure of the third frictional element is maintained at a stand-by pressure after being increased to a pre-charge pressure. The hydraulic pressure of the first frictional element is reduced or increased by respective slopes such that a slope of the turbine speed is prevented from changing sharply. That is, the slope of the turbine speed is controlled by controlling the hydraulic pressure of the first frictional element. In addition, the release of the first frictional element is controlled continuously until the N to N-3 shift is completed, and thereby the middle speed (N-1 speed) between the N speed and the N-3 speed cannot be realized. It the middle speed (N-1 speed) is achieved, a driver feels a double shift feel of a shift from the N speed to the middle speed (N-1 speed) and a shift from the middle speed to the N-3 speed. Therefore, the shift from the N speed to the N-3 speed is controlled such that the turbine speed of the middle speed can be realized but the middle speed cannot be achieved.

After that, the transmission control unit 250 determines whether the first shift synchronizing point is reached. The first shift synchronizing point may be reached when the current gear ratio is the same as the first predetermined gear ratio, and the first predetermined gear ratio may be the same as the gear ratio of the middle speed (N-1 speed) in an exemplary embodiment of the present invention. In addition, the middle speed (N-1 speed) is a speed where torque transmission in a shifting process can be minimized. If the present invention is applied to a 6 to 3 shift, the middle speed is a 5 speed.

If the first shift synchronizing point is reached, the transmission control unit 250 releases the hydraulic pressure of the second frictional element completely until a second shift synchronizing point is reached, and begins the engagement of the fourth frictional element. That is, the hydraulic pressure of the second frictional element is quickly reduced to "0" such that hydraulic pressure control is facilitated and the middle speed is not realized. In addition, the hydraulic pressure of the fourth frictional element is maintained at the stand-by pressure after being quickly increased to the pre-charge pressure.

After that, the transmission control unit 250 determines whether the second shift synchronizing point is reached. The second shill synchronizing point may be reached when the current gear ratio is the same as the second predetermined gear ratio, and the second predetermined gear ratio may be 30% of the gear ratio at the N-3 speed.

If the second shift synchronizing point is reached, the release of the second frictional element is completed and the transmission control unit 250 increases the hydraulic pressure for the engagement of the third frictional element with a predetermined pressure slope. That is, the hydraulic pressure of the third frictional element is increased to the on-coming pressure by a constant slope.

After that, the transmission control unit 250 determines whether the third shift synchronizing point is reached. The third shift synchronizing point may be reached when the current gear ratio is the same as the third predetermined gear ratio, and the third predetermined gear ratio may be the gear ratio at the N-3 speed in an exemplary embodiment of the present invention.

If the third shift synchronizing point is reached, the transmission control unit 250 completes the engagement of the third frictional element.

After the third shift synchronizing point is reached, the transmission control unit 250 completes the release of the first frictional element and the engagement of the fourth frictional element. That is, the hydraulic pressure of the first frictional element is reduced to "0" by a predetermined pressure slope, and the hydraulic pressure of the fourth frictional element is increased to the on-coming pressure by a predetermined pressure slope.

Figure 7:
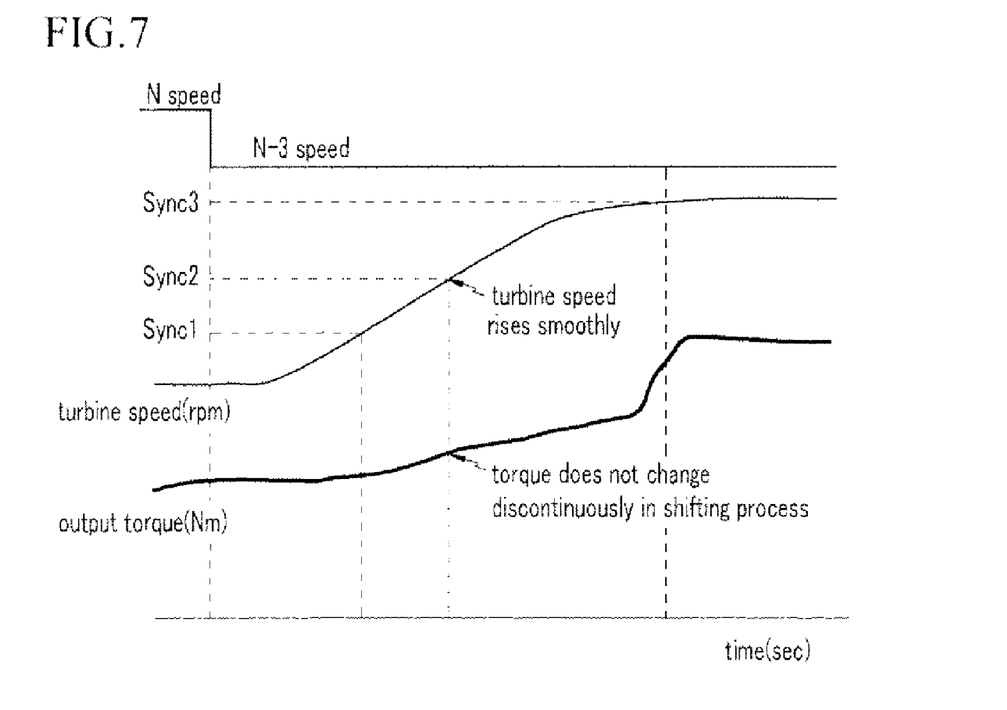
FIG. 7 is a graph showing a turbine speed and an output torque when a shift is performed according to an exemplary embodiment of the present invention.

As shown in FIG. 7, if a shift is performed according to an exemplary embodiment of the present invention, turbine speed rises smoothly and change of output torque is small. Therefore, shift feel may improve.

As described above, since a middle speed between an N speed and an N-3 speed is not achieved when a shift from the N speed to the N-3 speed is performed, shift feel may improve.

In addition, since a slope of a turbine speed is controlled only by controlling release of the first frictional element, hydraulic pressure control may be facilitated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission that controls a shift from an N speed achieved by engagement of first and second frictional elements to an N-3 speed achieved by engagement of third and fourth frictional elements,
wherein initial release of the second frictional element begins after initial release of the first frictional element begins, and
initial engagement of the fourth frictional element begins after initial engagement of the third frictional element begins, and
wherein engagement of the third frictional element is completed after release of the second frictional element is completed.

2. The shift control method of claim 1, wherein engagement of the third frictional element is completed before engagement of the fourth frictional element is completed.

3. The shift control method of claim 1, wherein the initial release of the first friction element and the initial engagement of the third frictional element begins substantially at the same time.

4. The shift control method of claim 3, wherein hydraulic pressure of the third frictional element is increased to a stand-by pressure.

5. The shift control method of claim 1, wherein the initial release of the second frictional element and the initial engagement of the fourth frictional element begins substantially at a first shift synchronizing point.

6. The shift control method of claim 5, wherein the first shift synchronizing point is reached when a current gear ratio is the same as a first predetermined gear ratio.

7. The shift control method of claim 6, wherein the first predetermined gear ratio is substantially the same as a gear ratio of an N-1 speed.

8. The shift control method of claim 5, wherein hydraulic pressure of the fourth frictional element is increased to a stand-by pressure.

9. The shift control method of claim 1, wherein the release of the second frictional element is completed substantially at a second shift synchronizing point and after the second shift synchronizing point, a hydraulic pressure for engagement of the third frictional element starts to be increased with a predetermined pressure slope.

10. The shift control method of claim 9, wherein the second shift synchronizing point is reached when a current gear ratio is the same as a second predetermined gear ratio.

11. The shift control method of claim 10, wherein the second predetermined gear ratio is substantially the same as 30 percent of a gear ratio of an N-3 speed.

12. The shift control method of claim 1, wherein engagement of the third frictional element is completed substantially on a third shift synchronizing point, and after the third shift synchronizing point, engagement of fourth frictional element is completed with a predetermined pressure slope and release of the first frictional element is completed with a predetermined pressure slope.

13. The shift control method of claim 12, wherein the third shift synchronizing point is reached when a current gear ratio is the same as a third predetermined gear ratio.

14. The shift control method of claim 13, wherein the third predetermined gear ratio is substantially the same as a gear ratio of an N-3 speed.

15. The shift control method of claim 1, wherein hydraulic pressure of the first frictional element is controlled such that a slope of a turbine speed is controlled.

* * * * *